US012073694B2

(12) United States Patent
Costello et al.

(10) Patent No.: US 12,073,694 B2
(45) **Date of Patent: *Aug. 27, 2024**

(54) CURRENCY TRAPPING DETECTION

(71) Applicant: NCR Atleos Corporation, Atlanta, GA (US)

(72) Inventors: Christopher John Costello, Suwanee, GA (US); Matthew Robert Burris, Lawrenceville, GA (US); Caleb Wayne Martinez, Fayetteville, GA (US); Jodessiah Sumpter, Alpharetta, GA (US); Gregory Joseph Hartl, Atlanta, GA (US)

(73) Assignee: NCR Atleos Corporation, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/125,452

(22) Filed: Mar. 23, 2023

(65) Prior Publication Data

US 2023/0252864 A1 Aug. 10, 2023

Related U.S. Application Data

(63) Continuation of application No. 17/665,021, filed on Feb. 4, 2022, now Pat. No. 11,676,460.

(51) Int. Cl.
*G07F 19/00* (2006.01)

(52) U.S. Cl.
CPC .................................. *G07F 19/207* (2013.01)

(58) Field of Classification Search
None
See application file for complete search history.

(56) References Cited

U.S. PATENT DOCUMENTS

| | | | | |
|---|---|---|---|---|
| 11,631,068 | B1 | 4/2023 | Krebs et al. | |
| 11,676,460 | B1 * | 6/2023 | Costello | G07F 19/2055 235/7 R |
| 2005/0073584 | A1 | 4/2005 | Enright et al. | |
| 2008/0136657 | A1 | 6/2008 | Clark et al. | |
| 2009/0201372 | A1 | 8/2009 | Odoherty et al. | |
| 2012/0038772 | A1 | 2/2012 | Priesterjahn et al. | |

(Continued)

FOREIGN PATENT DOCUMENTS

| | | |
|---|---|---|
| EP | 2453419 | 5/2012 |
| JP | 2016530645 | 9/2016 |
| JP | 2018010332 | 1/2018 |

OTHER PUBLICATIONS

"U.S. Appl. No. 17/665,021, Non Final Office Action mailed Sep. 16, 2022", 14 pgs.

(Continued)

*Primary Examiner* — Suezu Ellis
(74) *Attorney, Agent, or Firm* — Schwegman Lundberg & Woessner, P.A.

(57) ABSTRACT

Cash trapping at an Automated Teller Machine (ATM) is detected in real time. One or more images from one or more cameras are analyzed. The camera(s) is/are focused overhead of the ATM or on a cash slot of a dispense module for the ATM. The images are analyzed for determining one or more of whether the dispenser module is authentic, whether the cash slot opened or did not open when it should have opened for a cash withdraw, whether visual features of the dispense module have changed over a configurable period of time, and whether hands, gestures, and actions of a person present at the ATM indicate that cash trapping is taking place at the ATM. When cash trapping is detected at the ATM a variety of automated actions are processed, such as shutting down the dispense module, shutting down the ATM, notifying a financial institution, and/or notifying legal authorities.

19 Claims, 3 Drawing Sheets

(56) References Cited

U.S. PATENT DOCUMENTS

| | | | | |
|---|---|---|---|---|
| 2012/0038774 | A1* | 2/2012 | Reimann | G07F 19/207 348/150 |
| 2012/0038775 | A1 | 2/2012 | Priesterjahn et al. | |
| 2012/0160912 | A1 | 6/2012 | Laracey | |
| 2013/0124855 | A1 | 5/2013 | Varadarajan et al. | |
| 2014/0305352 | A1 | 10/2014 | Dowling et al. | |
| 2019/0073663 | A1 | 3/2019 | Jamkhedkar et al. | |
| 2019/0279468 | A1 | 9/2019 | Kishi et al. | |
| 2020/0357247 | A1* | 11/2020 | Farivar | G06V 20/52 |
| 2021/0004927 | A1* | 1/2021 | Sethi | G06Q 20/405 |
| 2022/0076543 | A1 | 3/2022 | Traynor et al. | |
| 2022/0108591 | A1* | 4/2022 | Jayabalan | G07F 19/209 |

OTHER PUBLICATIONS

"U.S. Appl. No. 17/665,021, Response filed Dec. 16, 2022 to Non Final Office Action mailed Sep. 16, 2022", 10 pgs.

"U.S. Appl. No. 17/665,021, Notice of Allowance mailed Feb. 6, 2023", 9 pgs.

"U.S. Appl. No. 17/732,838, Non Final Office Action mailed Jun. 16, 2023", 15 pgs.

"U.S. Appl. No. 17/732,889, Non Final Office Action mailed Jun. 21, 2023", 9 pgs.

"U.S. Appl. No. 17/732,838, Response filed Sep. 18, 2023 to Non Final Office Action mailed Jun. 16, 2023", 9 pgs.

"U.S. Appl. No. 17/732,889, Response filed Sep. 21, 2023 to Non Final Office Action mailed Jun. 21, 2023", 9 pgs.

"U.S. Appl. No. 17/732,889, Notice of Allowance mailed Sep. 28, 2023", 9 pgs.

"U.S. Appl. No. 17/732,838, Notice of Allowance mailed Oct. 2, 2023", 10 pgs.

"European Application Serial No. 21165422.3, Communication pursuant to Article 94(3) EPC mailed Oct. 11, 2023", 4 pgs.

"Japanese Application Serial No. 2022-211157, Notice of Reasons for Refusal mailed Oct. 27, 2023", w/ English Machine Translation, 10 pgs.

* cited by examiner

CURRENCY TRAPPING DETECTION

CROSS-REFERENCE TO RELATED APPLICATION

This application is a continuation of U.S. patent application Ser. No. 17/665,021, filed Feb. 4, 2022, which application and publication is incorporated herein by reference in its entirety.

BACKGROUND

Cash trapping is when a thief places a fraudulent device over a cash dispense module of an Automated Teller Machine (ATM) and leaves with the device inserted into the ATM. The device appears to be a closed shutter on the cash dispense module to users and is usually undetectable to the users. The device is designed to cover the cash dispense module and appear to look like a natural part of the ATM.

When an honest customer attempts to withdraw cash, the inside of the device traps and pinches down on the dispensed cash. The customer believes that no cash was dispensed, is confused, and will notify the bank. Meanwhile when the cash dispense module believes that the cash was not removed by the customer, the module tries to pull the cash back and a trapping mechanism of the fraudulent device traps and holds the cash in place. The thief then goes to the ATM and removes the fraudulent device along with the cash and will likely reinsert the fraudulent device for the next unsuspecting customer or move the device to a different ATM.

Fraud at ATMs is challenging to prevent, detect, and address for banks and their customers. When it occurs it directly impacts a consumer's bank account until the bank can do a full investigation and credit the funds back to their customers. It may take weeks before the customers have access to their funds while the bank investigates and depending upon the fraud method, the ATM may need to be serviced before it can reliably be used by the customers. Many customers cannot wait weeks to have access to their funds and lack of the funds may cause other issues for the customers, such as late bills, bounced checks, or going without something that is needed by the customers.

Current cash trapping detection approaches rely on hardware changes to the ATM and/or cash dispense module. This also necessitates a variety of software changes to the ATM and its modules. Adding any new hardware to an ATM requires substantial resources and each ATM has to be serviced in person. This is a costly approach that most banks want to avoid, but at present there are no viable lower cost and non-hardware-based solution available in the industry.

SUMMARY

In various embodiments, a system and methods for cash trapping detection are presented.

According to an aspect, a method for cash trapping detection is provided. At least one image captured by at least one camera situated at one or more locations associated with being: overhead of an Automated Teller Machine (ATM), adjacent to a cash dispense module of the ATM, and on the cash dispense module is obtained. The image is analyzed, and a determination is made as to whether a cash trapping device or cash trapping activity is present. When the cash trapping device or the cash trapping activity is detected, an alert or a notification is sent.

DETAILED DESCRIPTION

Figure 1:
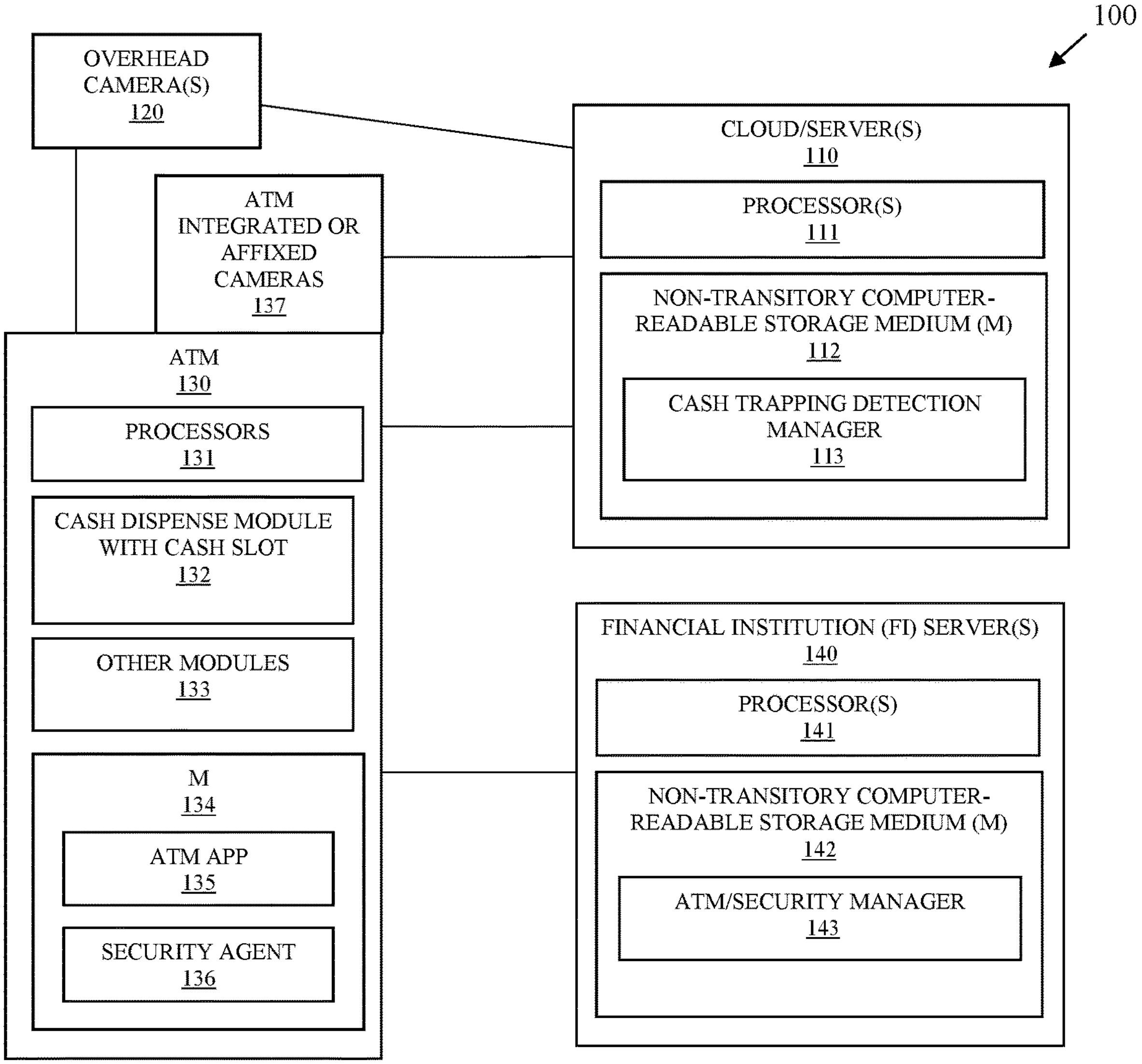
FIG. 1 is a diagram of a system for cash trapping detection, according to an example embodiment.

FIG. 1 is a diagram of a system 100 for cash trapping detection, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of cash trapping detection, presented herein and below.

As used herein and below the terms "cash" and "currency" may be used synonymously and interchangeably. This can be any government-backed note.

As will be demonstrated herein and below, system 100 and the methods that follow permit a low cost and accurate approach to detecting when a cash dispense module has been tampered with after the fact, when a cash dispense module is not operating as it should during a withdraw transaction, and/or when a cash dispense module is actively being tampered with as a cash trapping device is being inserted into the cash dispense module by a thief. One or a plurality of different cameras are used to provided images of the currency slot of the cash dispense module and or of hands of individuals adjacent to the cash dispense module.

The images are analyzed, in real time, either by a software module installed on the ATM, software installed on a local server associated with the ATM, or by a remote software module accessible over a remote server (such as a cloud) to determine when cash trapping is taking place at the ATM. Cash dispensing can be remotely deactivated for the ATM when cash trapping is detected, and an alert raised indicating that the ATM is in need of service for suspected cash trapping. Video clips may be captured for a time frame suspected of the cash trapping and sent with the alert. Moreover, any identifying objects associated with a suspected thief during a suspected cash trapping event can be isolated and sent to appropriate authorities. Any account card used by a thief to initially open the cash slot of the cash dispensing module for installing a cash trapping device can be flagged such that the thief's account is locked down.

System 100 includes a cloud/server 110 (optional), an Automated Teller Machine (ATM) 120, zero or more overhead cameras 120, one or more ATM integrated or affixed cameras 137, and ATM 130, and one or more financial institution (FI) servers 140.

Cloud/Server 110 (optional) comprises a processor 111 and a non-transitory computer-readable storage medium 112. Medium 112 comprises executable instructions for a cash trapping detection manager 113. The executable instructions when provided or obtained by the processor 111 from medium 112 cause the processor 111 to perform operations discussed herein with respect to 113.

Overhead cameras 120 (optional) stream image frames captured from above ATM 130. Overhead cameras 120 are not attached or affixed to ATM 130. Overhead cameras 120 stream the images for the image frames directly to a storage location on ATM 130 and/or cloud/server 110.

ATM integrated or affixed cameras 137 stream image frames captured from within the cash slot directed out of the cash slot for cash dispense module (towards a shutter of the cash slot) or from one or more exterior side surfaces of the ATM 130 focused on the cash slot. ATM integrated or affixed cameras 137 stream the images for the image frames directly to a storage location on ATM 130 and/or cloud/server 110.

It is noted that cameras 120 and/or 137 may be existing cameras 120 and/or 137 situated overhead of the ATM 120 for security purposes and/or integrated as a peripheral device of the ATM 120. Thus, in some embodiments no additional or new cameras are needed beyond what is already present at the ATM 120 for security monitoring. In some instances, existing cameras 120 and/or 137 can be refocused or reangled from their existing locations for purposes of some of the embodiments that follow.

It is noted in other embodiments, additional new cameras 120 and/or 137 are deployed and positioned (located and focused) for the purposes of some embodiments that follow.

In some embodiments, cameras 120 and/or 137 may be a combination of existing and new cameras 120 and/or 137.

The image frames are processed in a variety of optional or complementary manners either by cash trapping detection manager 113 and/or security agent 136. That is, each image processing technique (discussed herein in the various embodiments that follow) does not have to be exclusively performed; rather, each of the embodiments, a combination of the embodiments, or all of the embodiments can be processed individually or in any combination with one another. Furthermore, the image processing techniques may be processed exclusively on ATM 130 by security agent 136, exclusively on cloud/server 110 by cash trapping detection manager 113, or by security agent 136 and cash trapping detection manager 113 cooperating with one another to perform the image processing technique(s).

In a first image processing technique, agent 136 and/or detection manager 113 receive image frames from cameras 120 and/or 137 and process a deep machine-learning algorithm/model (MLM) for purposes of verifying the cash dispense module with cash slot 132. The model is trained on images of 132 across various times of day and weather conditions, such at night, during the morning, during the afternoon, during the evening, during a sunny day, during each of the seasons or days of the year, during a storm, etc. for purposes of learning the visual appearance and features of 132. Once trained agent 136 and/or detection manager 113 is configured to obtain an image or set of images every X minutes and pass the image or set of images to the MLM, the MLM returns a confidence value as to whether the captured cash dispense model with cash slot 132 is verified or not verified. The agent 136 and/or detection manager 113 compares the confidence value against a threshold value, if the confidence value meets or exceeds the threshold value nothing more is done, the cash dispense module with cash slot 132 is verified meaning it is untainted with a cash trapping device. If the confidence value falls below the threshold value, agent 136 and/or detection manager 113 a message is sent to ATM app 135 to shut down the cash dispense capabilities of the ATM 130, and a notification is sent to ATM/security manager 143.

In a second image processing technique, an event is raised by the ATM 130 when a cash withdraw operation is requested by a customer at the ATM 130 and image corresponding to the time the operation was requested is taken by camera 120 and/or 137 of the cash dispense module with cash slot 132. Next, agent 136 and/or detection manager 113 sends a message to ATM app 135 to open the cash slot of dispense module 132 but delay dispensing the cash for a configured amount of time (X seconds), another image is taken of the dispense module with cash slot 132. This second image should show the cash slot open. The agent 136 and/or detection manager 113 compares the two images (one when the withdrawal was requested and one when the cash slot opened but the dispense module 132 delayed dispensing the cash). If the two images are identical or substantially similar to one another, then this is evidence that the cash dispense module with cash slot 132 has a cash trapping device installed and a message is sent to ATM app 135 to instruct the cash dispense module with cash slot to not dispense the cash and to transport the cash back to the appropriate currency cassette (one of the other modules 133 of the ATM 130). If the two images are different or different within a predefined tolerance level, the agent 136 and/or detection manager 113 sends a message to the ATM app 135 to instruct the cash dispense module with cash slot 132 to dispense the cash to conclude the currency withdraw transactions because there is no cash trapping device installed on dispense module 132.

In a third image processing technique, agent 136 and/or detection manager 113 uses computer vision algorithms to extract visual features of the cash dispense module with cash slot 132 (edges, color, contour lines, etc.). Images captured by cameras 120 and/or 137 are compared over a configured period of time (such as every hour, every 10 minutes, etc.) using the visual feature extracting. If significant changes are detected, agent 136 and/or detection manager 113 send a notification to ATM/security manager 143 to shut down the ATM 130 and inspect the cash dispense module with cash slot 132.

In a fourth image processing technique, images taken by cameras 120 and 137 are monitored and tracked by agent 136 and/or detection manager 113 using a vision-tracking algorithm. The algorithm is trained to recognize and track hands or hands with gloves on adjacent to the cash slot of dispense module 132. Bounding boxes in the images are placed around the hands or the gloves. Unexpected objects in the hands or gloves are also identified with bounding boxes within the images. A card (such as a bankcard) is not an unexpected object. The algorithm also identifies hand gestures, such that when a hand gesture indicates a potential for fraudulent behavior along with an unexpected object (such as a cash trapping device), agent 136 and/or detection manager 113 can trigger a variety of automated actions, such as and by way of example only, capturing a video clip corresponding to the activity at the ATM 130, sending the video clips for review to ATM/security manager 143, sending the video clip to a law enforcement agency for review and action, sending a message to ATM app 135 to halt the transaction on the ATM 130 and shut down the ATM 130, capturing an image of any bankcard used during the tracking by the hands (this may be used to open the cash slot to install or deinstall a cash trap under a legitimate account of the thief), using Optical Character Recognition (OCR) on any card detected to identify a legitimate bank account or stolen bank account being used by the thief, and sending a message with the bank account to ATM/Security manager 143 to suspend any activity from that account until a full review is done, etc. Actions can be detected based on the hand gestures and/or unrecognized objects in the hands, such as an attempt to jam the dispenser, removing cash when there is no present transaction at the ATM 130 from the cash slot, installing a cash trapping device, etc. Agent 136 and/or detection manager 113 can receive identifiers for hand gestures and actions as flagged by the vision-tracking algorithm and score the gestures and actions, any score above a set threshold score value can be assumed to be a cash trapping event and any of the above-noted automated actions can be processed through messages and notifications sent to the ATM app 135 and ATM/security manager 143.

In an embodiment, of the fourth image processing technique, an overhead camera 120 captures and tracks the hands of a person present at the ATM 130 as discussed above, frame tracking of the images indicate that the person never engages the ATM 130 (does not touch the touchscreen or keypad and does not have any bankcard) but the hands are near or adjacent to the cash slot of dispense module 132 for X amount of time. This could be indicative of a thief installing a cash trapping device or coming back to remove a previously installed cash trapping device. In such situations, security agent 136 and/or cash trapping detection manager 113 sends an alert to ATM/security manager 143.

Again, just one of the above-mentioned image processing techniques can be deployed, a combination of the techniques employed, or all of the techniques employed for any given ATM 130.

In an embodiment, only cash trapping detection manager 113 is deployed for one, some combination, or all of the image processing techniques. In this embodiment, only the images taken by one or more cameras 120 and/or 137 need to be accessible to cloud/server 110 in real time from a network-accessible storage location. No changes are required on the existing ATM 130 for system 100 to operate and detect cash trapping and send notifications and messages to shut down the ATM 130.

In an embodiment, only security agent 136 is deployed for one, some combination, or all of the image processing techniques on the ATM 130. This can be done remotely and is only a software change on ATM 130 and does not require any hardware change on ATM 130.

In an embodiment, both cash trapping detection manager 113 and security agent 136 are deployed. For example, security agent 136 may process an Application Programming Interface (API) to interact with cash trapping detection manager 113, which permits cash trapping detection manager 113 to relay instructions to ATM 135 to shut down the cash dispense module with slot 132 or shut down ATM 135 entirely. In another situation, cash trapping detection manager 113 may process one or a subset of the image processing techniques independent of security agent 136 processing one or a subset of the image processing techniques both the cash trapping detection manager 113 and security agent 136 can each independent detect a cash trapping event and shut down dispense module 132 and notify ATM/security manager 143. In still another situation both cash trapping detection manager 113 and security agent 136 each independently process a same image processing technique or a same set of image processing techniques and compare results with one another for determining whether a cash trapping event is to be raised and automated actions taken.

In an embodiment, cash trapping detection manager 113 is processed on a local server 110 associated with ATM 130.

In an embodiment, cash trapping detection manager 113 is processed on a cloud 110.

In an embodiment, only a single camera 120 or 137 is deployed with the system 100. In an embodiment, the single camera is overhead camera 120. In an embodiment, the single camera is integrated or affixed camera 137.

In an embodiment, more than one camera 120 or 137 is deployed with system 100. In an embodiment each of the more than one cameras are overhead cameras 120. In an embodiment each of the one or more cameras are integrated or affixed cameras 137. In an embodiment, at least one of the one or more cameras is an overhead camera 120 and at least one other of the one or more cameras is an integrated or affixed camera 137.

One now appreciates how cash trapping detection can be performed using existing camera infrastructures of ATMs 130 without deploying costly hardware modifications to the dispense module 132 or any other modules 133 of the ATMs 130. Cash trapping can be detected in real time and halted, and the proper resources notified. In some cases, images of the thief and account information for the thief can be captured from the images and relayed to the appropriate entities (financial institutions and legal authorities for further investigations).

These embodiments and other embodiments are now discussed with reference to the FIGS. 2-3.

Figure 2:
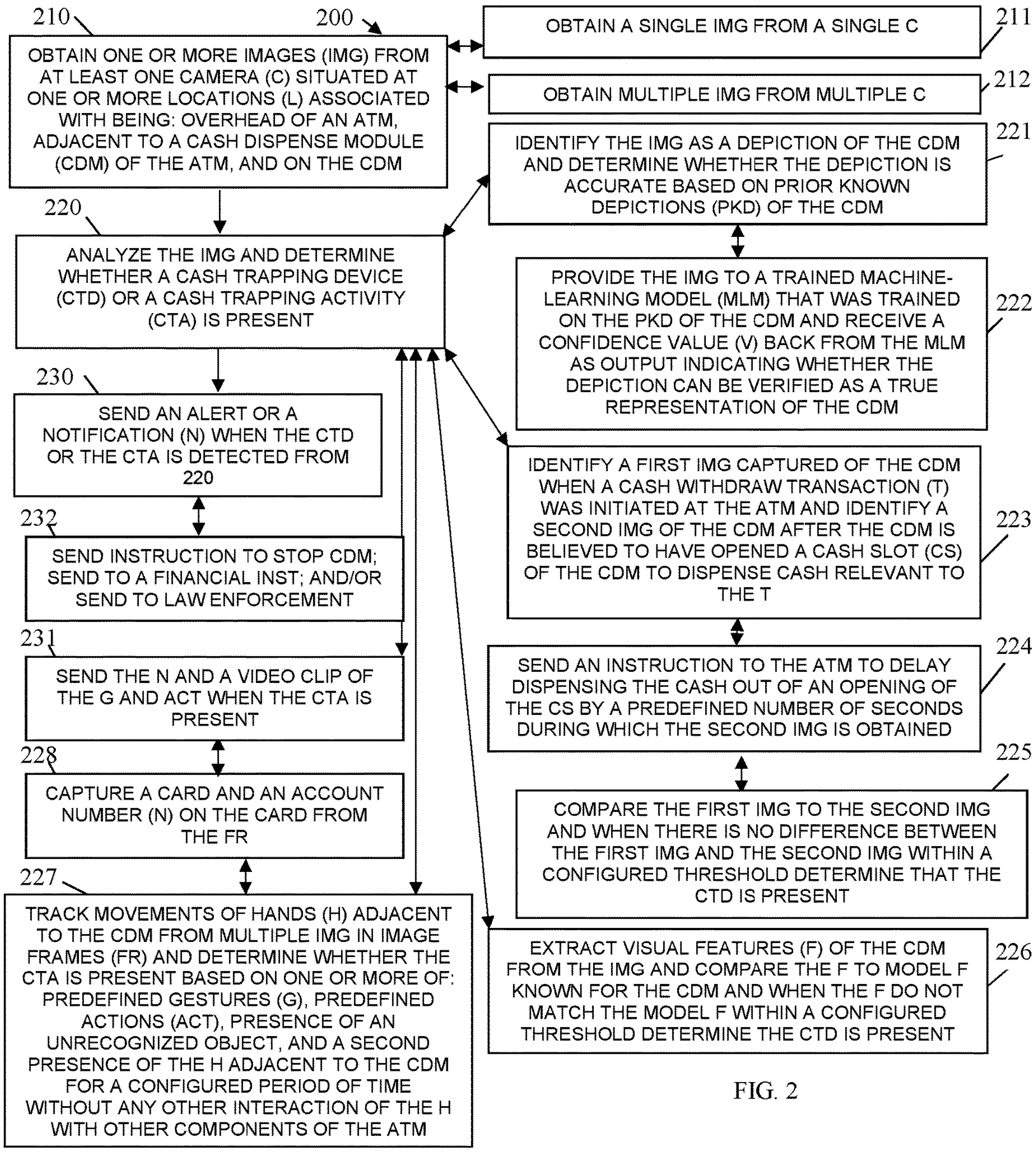
FIG. 2 is a diagram of a method for cash trapping detection, according to an example embodiment.

FIG. 2 is a diagram of a method 200 for cash trapping detection, according to an example embodiment. The software module(s) that implements the method 200 is referred to as a "cash trapping detection manager." The cash trapping detection manager is implemented as executable instructions programmed and residing within memory and/or a non-transitory computer-readable (processor-readable) storage medium and executed by one or more processors of a device. The processor(s) of the device that executes the cash trapping detection manager are specifically configured and programmed to process the cash trapping detection manager. The cash trapping detection manager has access to one or more network connections during its processing. The network connections can be wired, wireless, or a combination of wired and wireless.

In an embodiment, the cash trapping detection manager executes on cloud 110. In an embodiment, the scene item identifier executes on server 110.

In an embodiment, the cash trapping detection manager executes on ATM 130.

In an embodiment, a portion of the cash trapping detection manager executes on cloud/server 110 and another portion of the cash trapping detection manager executes on ATM 130.

In an embodiment, the cash trapping detection manager is one of or both of 113 and 136.

At 210, the cash trapping detection manager obtains one or more images from at least one camera 120 and/or 137 situated at one or more locations associated with being overhead of an ATM 130, adjacent to a cash dispense module 132, and on the cash dispense module 132.

In an embodiment, at 211, the cash trapping detection manager obtains a single image from a single camera 120 or 137.

In an embodiment, at 212, the cash trapping detection manager obtains multiple images from multiple cameras 120 and 137.

At 220, the cash trapping detection manager analyzes the images and determines whether a cash trapping device or a cash trapping activity is present/detected.

In an embodiment, at 221, the cash trapping detection manager identifies the image as a depiction of the cash dispense module 132 and determines whether the depiction is accurate based on prior known depictions of the cash dispense module 132.

In an embodiment, the prior known depictions are of a generic dispense module integrated into a generic ATM.

In an embodiment, the prior known depictions are for the specific dispense module 132 integrated into the ATM 130.

In an embodiment of 221 and at 222, the cash trapping detection manager provides the image to a trained machine-learning model (MLM) that was trained on the prior known depictions of the cash dispense module 132. The cash trapping detection manager receives back from the MLM as output an indication whether the depiction can be verified as a true representation (unmodified) of the cash dispense module 132.

In an embodiment, at 223, the cash trapping detection manager identifies a first image captured of the cash dispense module 132 when a cash withdraw transaction was initiated at an ATM 130 and identifies a second image of the cash dispense module 132 after the cash dispense module 132 is believed to have opened a cash slot of the cash dispense module 132 to dispense cash relevant to the transaction.

In an embodiment of 223 and at 224, the cash trapping detection manager sends (or causes to send) an instruction to the ATM 130 to delay dispensing the cash out of an opening of the cash slot by a predefined number of seconds during which the second image is obtained.

In an embodiment of 224 and at 225, the cash trapping detection manager compares the first image to the second image and when there is no difference between the first image and the second image within a configured threshold, the cash trapping detection manager determines that the cash trapping device is present.

In an embodiment, at 226, the cash trapping detection manager extracts visual features of the cash dispense module 132 from the images and compares to model visual features known for the cash dispense module 132. When the features do not match the model features within a configured threshold, the cash trapping detection manager determines that the cash trapping device is present.

In an embodiment, at 227, the cash trapping detection manager tracks movements of hands adjacent to the cash dispense module 132 from multiple images in image frames and determines whether the cash trapping activity is present based on one of more of: predefined gestures, predefined actions, a presence of an unrecognized object in one or more of the hands, and a second presence of the hands adjacent to the cash dispense module 132 for a configured period of time without any other interactions of the hands with other modules, peripheral, or components of the ATM 130.

In an embodiment of 227 and at 228, the cash trapping detection manager captures a card and an account number on the card from the image frames.

At 230, the cash trapping detection manager sends an alert or a notification when the cash trapping device is detected or when the cash trapping activity is detected based on 220.

In an embodiment of 228 and 230, at 231, the cash trapping detection manager sends the account number and a video clip of the hand gestures and hand actions with the alert or the notification when the cash trapping activity is present.

In an embodiment, at 232, the cash trapping detection manager sends an instruction to the ATM 130 to stop operation of the cash dispense module 132, sends the alert or notification to a financial institution, and/or sends the alert or notification to law enforcement.

Figure 3:
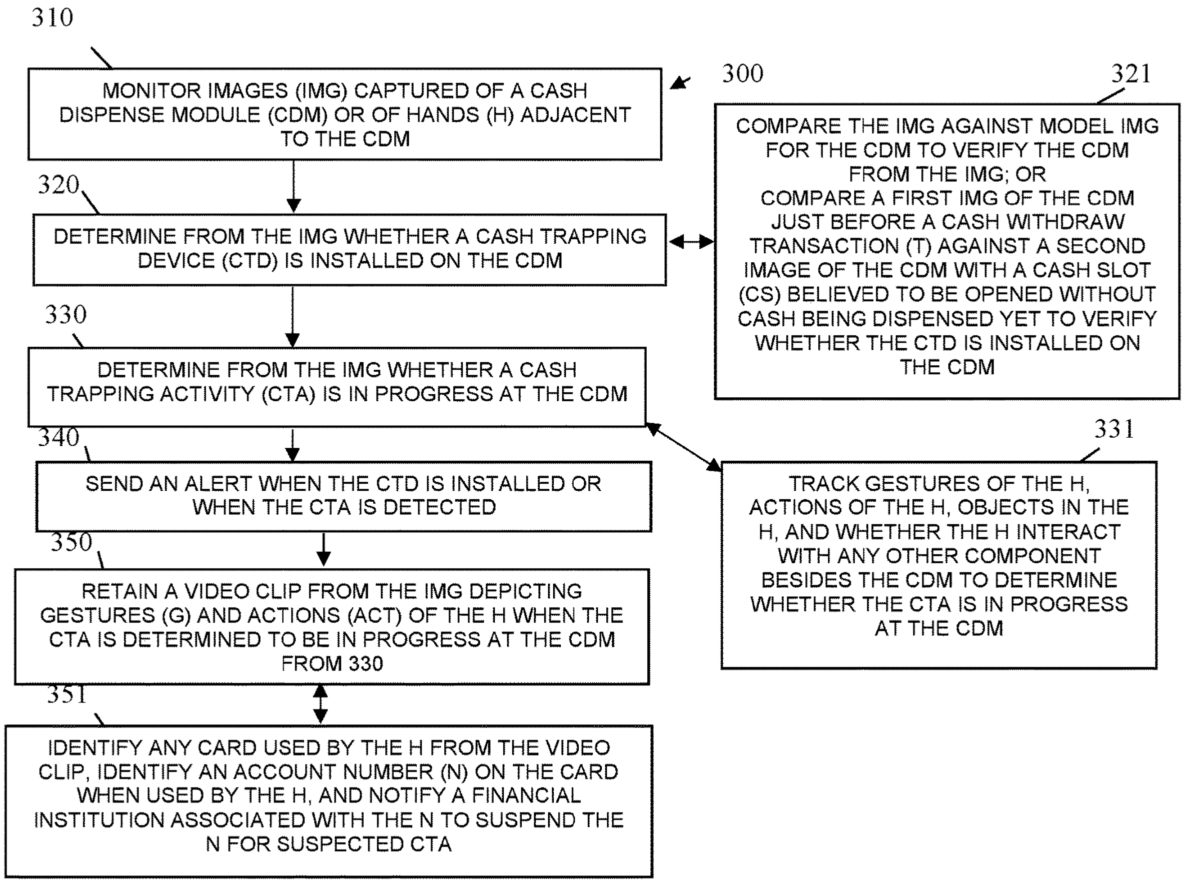
FIG. 3 is a diagram of another method for cash trapping detection, according to an example embodiment.

FIG. 3 is a diagram of another method 300 for cash trapping detection, according to an example embodiment. The software module(s) that implements the method 200 is referred to as an "image-based cash trapping detection manager" The image-based cash trapping detection manager is implemented as executable instructions programmed and residing within memory and/or a non-transitory computer-readable (processor-readable) storage medium and executed by one or more processors of a device. The processor(s) of the device that executes the image-based cash trapping detection manager are specifically configured and programmed to process the image-based cash trapping detection manager. The image-based cash trapping detection manager has access to one or more network connections during its processing. The network connections can be wired, wireless, or a combination of wired and wireless.

In an embodiment, the device that executes the image-based cash trapping detection manager is cloud 110. In an embodiment, the device that executes the image-based cash trapping detection manager is server 110.

In an embodiment, the device that executes the image-based cash trapping detection manager is ATM 130.

In an embodiment a portion of the image-based cash trapping detection manager executes on cloud/server 110 and another portion of the image-based cash trapping detection manager executes on ATM 130.

In an embodiment, the image-based cash trapping detection manager is one of, some combination of, or all of 113, 136, and/or method 200.

The image-based cash trapping detection manager presents another and, in some ways, enhanced processing perspective from that which was discussed above with method 200 of FIG. 2.

At 310, the image-based cash trapping detection manager monitors images captured of a cash dispense module 132 or of hands adjacent to the cash dispense module 132.

At 320, the image-based cash trapping detection manager determines from the images whether a cash trapping device is installed on the cash dispense module 132.

In an embodiment, at 321, the image-based cash trapping detection manager compares the images against a model image for the cash dispense module 132 to verify the cash dispense module 132 from the images. The image-based cash trapping detection manager may also compare a first image of the cash dispense module 132 just before a cash withdraw transaction against a second image of the cash dispense module 132 with a cash slot believed to be opened without cash being dispensed yet to verify whether the cash trapping device is installed on the cash dispense module 132.

At 330, the image-based cash trapping detection manager determines from the images whether a cash trapping activity is in progress at the cash dispense module 132.

In an embodiment, at 331, the image-based cash trapping detection manager tracks gestures of the hands, actions of the hands, objects in the hands, and whether the hands interaction with any other components besides the cash dispense module 132 to determine whether a cash trapping activity is in progress.

At 340, the image-based cash trapping detection manager sends an alert when the cash trapping device is installed or when the cash trapping activity is detected.

In an embodiment, at 350, the image-based cash trapping detection manager retains a video clip from the images depicting gestures and actions of the hands when the cash trapping activity is determined to be in progress at the cash dispense module 132 from 330.

In an embodiment of 350 and at 351, the image-based cash trapping detection manager identifies any card used by the hands from the video clip, identifies an account number on the card when used by the hands, and notifies a financial institution associated with the account number to suspend the account number for suspected cash trapping activity.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

determining whether a cash dispense module of a transaction terminal is actively being tampered with based on at least one image captured of the cash dispense module or captured of an area adjacent to the cash dispense module; and sending an alert when the at least one image is determined to depict the cash dispense module is actively being tampered with, wherein sending further includes identifying a card from the at least one image and an account number for the card and sending the account number with the alert causing the account number to be suspended pending a review of the at least one image.

2. The method of claim 1, wherein sending further includes generating a video clip from a video of the cash dispense module or the area adjacent to the cash dispense module and sending the video clip with the alert when the alert is sent, wherein the video includes that at least one image and other images of the cash dispense module or the area adjacent to the cash dispense module.

3. The method of claim 1, wherein sending further includes sending an instruction to the transaction terminal to shut down when the alert is sent.

4. The method of claim 3, wherein sending further includes sending the alert to one or more of:

a financial institution server for a financial institution associated with the transaction terminal and a law enforcement server for law enforcement when the alert is sent.

5. The method of claim 1, wherein determining further includes comparing a previous captured image of the cash dispense module or the area adjacent to the cash dispense module against the at least one image in order determine whether the cash dispense module is actively being tampered with.

6. The method of claim 1, wherein determining further includes obtaining the at least one image when the transaction terminal reports a cash slot of the cash dispense module is opened to receive cash during a cash withdraw transaction at the transaction terminal.

7. The method of claim 6, wherein obtaining further includes determining from the at least one image whether the cash slot is opened or closed from the at least one image and when the cash slot is closed determining that the cash dispense module is actively being tampered with.

8. The method of claim 1, wherein determining further includes identifying in the at least one image an object associated with cash dispense module tampering that is depicted in a hand in the area adjacent to the cash dispense module and determining the cash dispense module is actively being tampered with.

9. The method of claim 1, wherein determining further includes identifying in the at least one image a hand gesture associated with cash dispense module tampering that is depicted in the area adjacent to the cash dispense module and determining the cash dispense module is actively being tampered with.

10. The method of claim 1, wherein determining further includes identify in the at least one image an unrecognized object depicted in the area adjacent to the cash dispense module and determining the cash dispense module is actively being tampered with.

11. A method, comprising:

monitoring image frames of a video depicting a cash dispense module or an area adjacent to the cash dispense module;

determining from at least one image frames that the cash dispense module is potentially being tampered with by a cash trapping activity or a cash trapping device; and sending an alert when the cash dispense module is potentially being tampered with, wherein sending further includes identifying a card from the at least one image and an account number for the card and sending the account number with the alert causing the account number to be suspended pending a review of the at least one image.

12. The method of claim 11, wherein sending further includes sending an instruction that causes a transaction terminal associated with the cash dispense module to shut down for transactions when the cash dispense module is potentially being tampered with.

13. The method of claim 11, wherein sending further includes sending the alert to one or more of financial institution server of a financial institution associated with a transaction terminal that includes the cash dispense module and a law enforcement server associated with law enforcement when the cash dispense module is potentially being tampered with.

14. The method of claim 11 further comprising, capturing a video clip associated with the at least one image from the video and providing the video clip with the alert when the cash dispense module is potentially being tampered with.

15. The method of claim 11, wherein determining further includes:

obtaining a first event from a transaction terminal associated with the cash dispense module indicating that a cash withdraw transaction was requested at the transaction terminal;

obtaining a first image frame from the video of the cash dispense module that corresponds to the first event;

instructing the transaction terminal to open a cash slot of the cash dispense module but delay for a configured period of elapsed time before dispensing the cash associated with the cash withdraw transaction through the cash dispense module;

obtaining a second image frame from the video of the cash dispense module that corresponds to a time that the cash slot should be opened by the transaction terminal; and determining by comparison of the first image frame and the second image frame whether the cash dispense module is actively being tampered with when the second image frame does not depict the cash slot opened to dispense cash for the cash withdraw transaction or when the first image frame and the second image frame are substantially the same.

16. The method of claim 15, wherein determining by comparison further includes determining that the first image frame and the second image frame are substantially the same or determining that the second image frame does not depict the cash slot opened and instructing the transaction terminal to transport the cash back to an appropriate currency cassette of the transaction terminal, to not dispense the cash through the cash dispense module, and to shut down for any further transactions.

17. The method of claim 15, wherein determining by comparison further includes determining that the first image frame and the second image frame are different or determining that the second image frame depicts the cash slot opened and instructing the transaction terminal to dispense the cash for the cash withdraw through the cash dispense module.

18. A system, comprising:

at least one camera to capture video of a cash dispense module of a transaction terminal or an area adjacent to the cash dispense module;

the transaction terminal;

a server comprising a processor and a non-transitory computer-readable storage medium; and the non-transitory computer-readable storage medium comprising instructions which when executed by the processor cause the processor to perform operations comprising:

analyzing image frames of the video provided by the camera;

determining from the image frames when the cash dispense module is potentially being tampered with; and sending an alert and shutting down the transaction terminal when the determining indicates the cash dispense module is potentially being tampered with, wherein sending further includes identifying a card from the image frames and an account number for the card and sending the account number with the alert causing the account number to be suspended pending a review of the at least one image.

19. The system of claim 18, wherein the transaction terminal is an automated teller machine, a self-service terminal, or a point-of-sale terminal.

* * * * *